Dec. 17, 1968  H. M. PIKER  3,416,691
THERMALLY INSULATED CONTAINER
Filed June 23, 1965  3 Sheets-Sheet 1
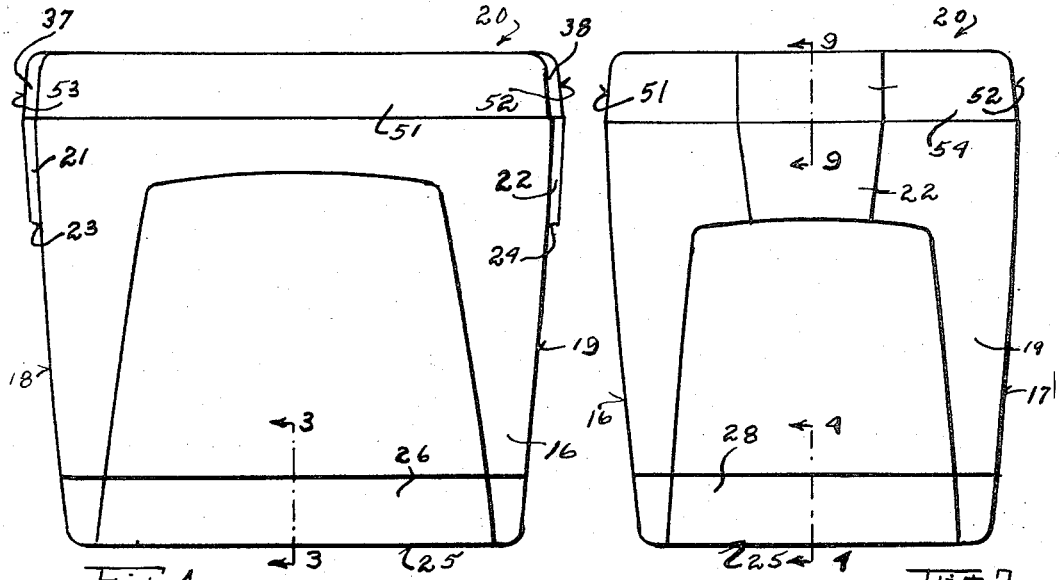
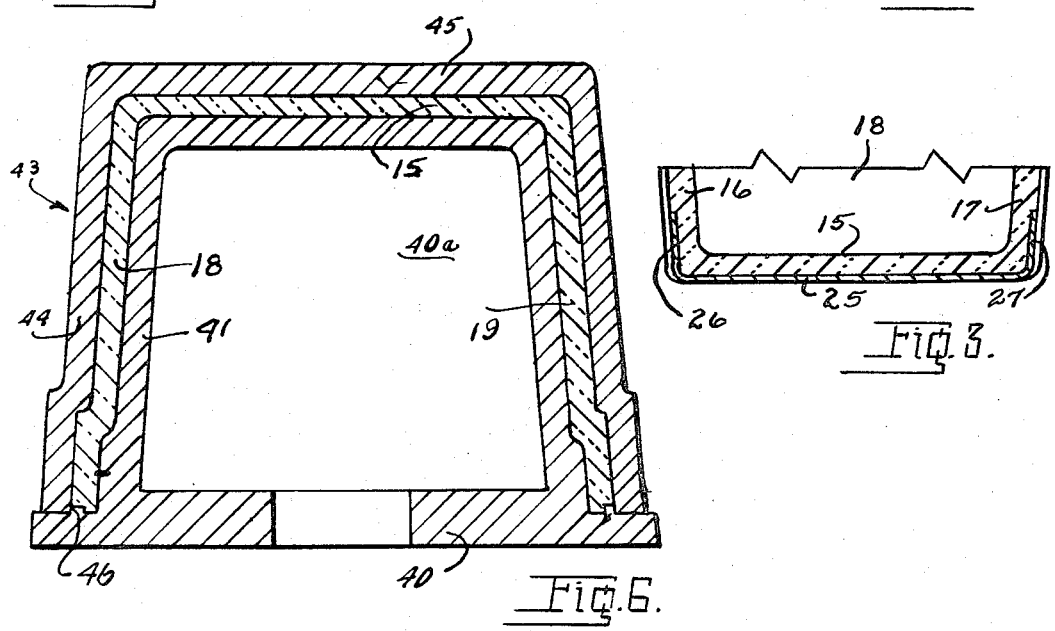
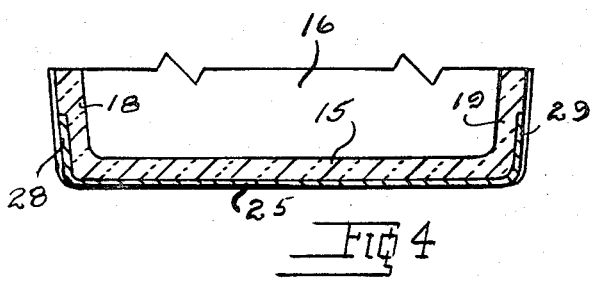
INVENTOR
HERBERT M. PIKER
BY Joseph A. Rave
Attorney Dec. 17, 1968    H. M. PIKER    3,416,691
THERMALLY INSULATED CONTAINER
Filed June 23, 1965    3 Sheets-Sheet 2
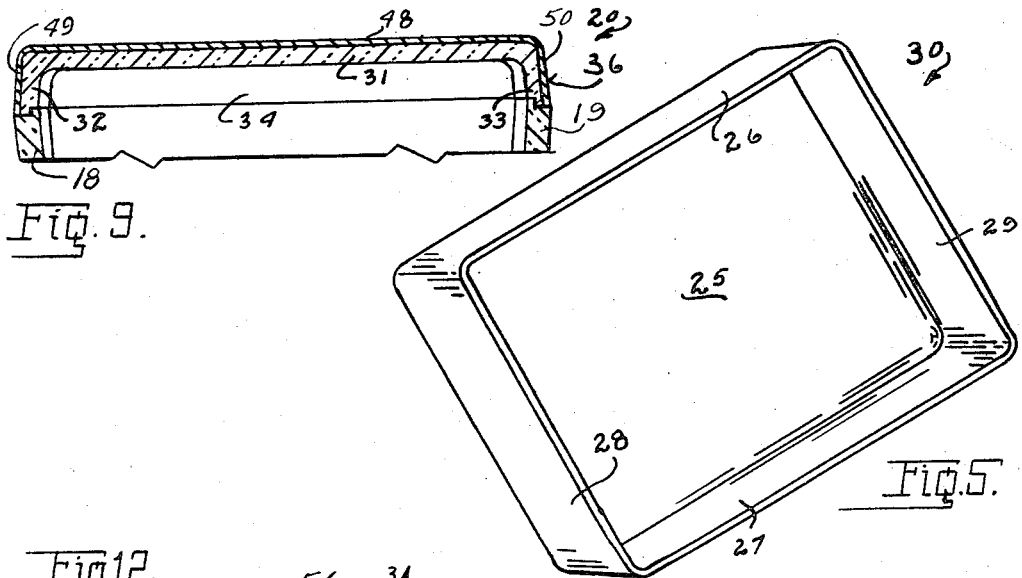
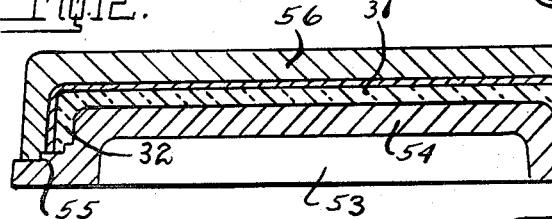
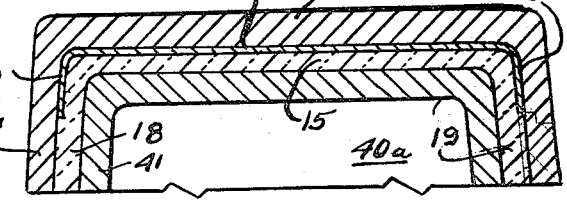
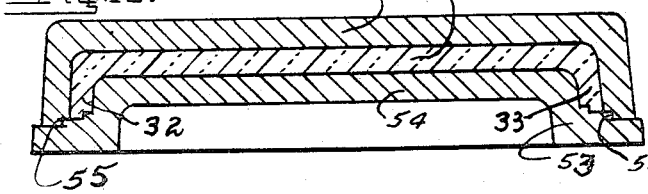
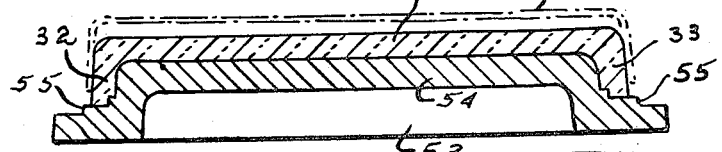
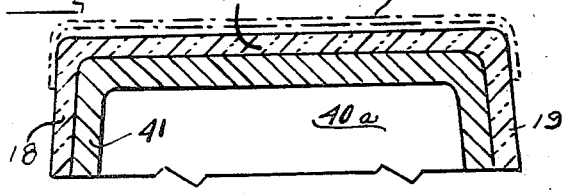
INVENTOR
HERBERT M. PIKER
BY
Joseph A. Pane
Attorney Dec. 17, 1968  H. M. PIKER  3,416,691
THERMALLY INSULATED CONTAINER
Filed June 23, 1965  3 Sheets-Sheet 3

INVENTOR
HERBERT M. PIKER
BY Joseph A. Rave
Attorney

United States Patent Office 3,416,691
Patented Dec. 17, 1968

3,416,691
THERMALLY INSULATED CONTAINER
Herbert M. Piker, Wyoming, Ohio, assignor to The Hamilton-Skotch Corporation, Hamilton, Ohio, a corporation of Ohio
Filed June 23, 1965, Ser. No. 466,230
2 Claims. (Cl. 220—9)

ABSTRACT OF THE DISCLOSURE

The containers of the present invention are formed of expansible polystyrene foam particles resulting in the containers having relatively thick bottom, cover and spacing walls between said bottom and cover with the outer surfaces of said container bottom, top and separating walls quite soft and capable of deformation and bruises. The application of a relatively hard polystyrene sheet to the chest bottom and for a distance upwardly of said bottom to act as a kick-strip and thereby prevent damage to the chest bottom outer surface and walls outer surface upwardly from the bottom. The adherence of a similar hard polystyrene sheet to the outer surface of the cover avoids damage to the cover top surface and depending walls outer surface.

---

This invention relates to improvements in containers such as those used on picnics either in the form of containers for liquids or the containers generally elongated and referred to as chests or the like and which are used to transport food.

The containers, whether of the liquid carrying type or the food carrying type, are frequently made of single thickness plastic and of a plastic that is expansible while being processed and yet has an outer surface that is relatively soft and readily damaged when placed on or pushed against a hard object or the said harder object pushed into the said chest. Damage is frequently due to the said container by a person's shoe due to inadvertent kicking and contact and the placing of the container on a rough surface.

This invention consists of applying to the said soft outer surfaced container a tough covering which, as illustrated by a portion of this application, is primarily on the bottom and lower ends of the container sides, and sometimes referred to as a "kick strip."

Complete articles formed of the said plastic material may be covered throughout their exterior or interior surface, or both inner and outer surfaces, by the mechanism and by the method of the present invention. Such article would be the cover or lid for a cooler chest, or the like, the inner surface of a cooler chest, or, as intimated above, the bottom of a container and the exterior surface of the walls for a distance upwardly from said bottom.

The principal object, therefore, of the present invention is the provision of formed or molded articles of plastic having a relatively tough surfaced material substantially permanently secured thereto.

Another object of the present invention is the provision of a formed plastic article of relaively soft material and having certain surfaces and/or certain portions of other surfaces provided with a tough outer surface.

Another object of this invention is the provision of a formed plastic article having considerable thickness for insulation purposes and having an exterior surface with a relatively tough outer surface to receive and absorb kicks, bumps and the like without sustaining damage in its outer skin and preserving the surface of the insulating wall.

A further and specific object of the present invention is the provision of a formed object formed of plastic such as expansible polystyrene foam, and having a relatively soft exterior surface together with a re-inforcing strip, complete outer covering, and/or a complete inner covering, or the like, formed of plastic that has a very hard or tough outer surface, such as a preformed polystyrene sheet, bonded to the relatively soft outer surface of the formed object.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

FIG. 1 is a slide elevational view of a food carrying, or the like, chest having incorporated therein the improvements of the present invention.

FIG. 2 is an end elevational view of the chest of FIG. 1.

FIG. 3 is a fragmentary sectional view through the lower end of the container of FIGS. 1 and 2 as seen from line 3—3 on FIG. 1.

FIG. 4 is a view similar to FIG. 3 but taken transversely to said FIG. 3 and as seen from line 4—4 on FIG. 2.

FIG. 5 is a perspective view of a kick protector, or the like, sometimes referred to hereinafter as a tough skin, forming a detail of the present invention.

FIG. 6 is a view in longitudinal cross-section showing the first step in the the method of producing the chest of FIGS. 1 and 2.

FIG. 7 is a fragmentary sectional view through a portion of the disclosure in FIG. 6 illustrating a second and further step in the method of producing the chest.

FIG. 8 is a fragmentary longitudinal sectional view of a portion of FIG. 6, similar to FIG. 7, disclosing a further and final step in the method of producing the article of FIGS. 1 and 2.

FIG. 9 is a fragmentary, sectional view through the upper end of FIG. 1, primarily the closing lid or cover, as seen from line 9—9 on FIG. 2.

FIG. 10 is a cross-sectional view of the first step in the process of producing the chest lid or cover with its outer tough skin such as illustrated in FIG. 9.

FIG. 11 is a cross-sectional view of the second and further steps in process of producing the complete cover of FIG. 9.

FIG. 12 is a cross-sectional view similar to FIGS. 10 and 11 showing the final step in process of producing the chest cover or lid.

Throughout the several views of the drawings similar reference characters are employed to denote the same or similar parts.

Figure 13:
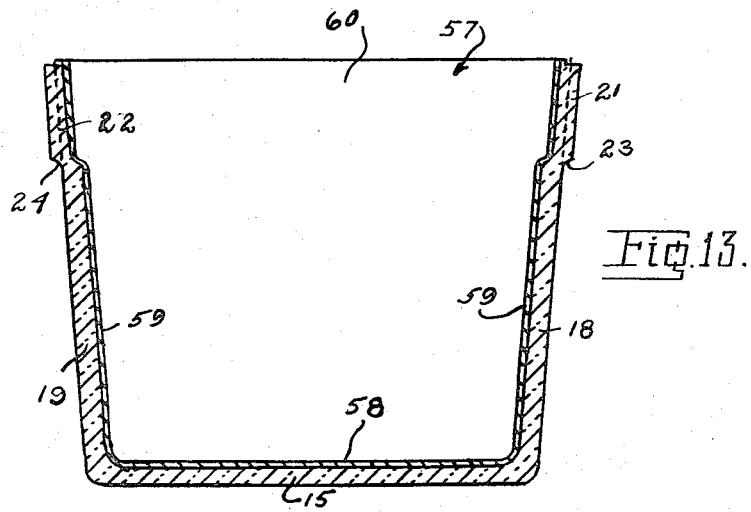
FIG. 13 is a vertical sectional view through a chest similar to FIG. 1 but showing the hard skin liner of the present invention interiorly of the chest.

As noted above the invention is adapted to the production of articles such as used in carrying or transporting liquids and food to relatively distant places, such as picnic areas and the like. The invention is illustrated in the drawings in connection with the formation of a relatively large container, such as food chest as used in transporting food, as distinguished from a container for liquids.

As shown in the drawings the chest comprises, see FIGS. 3 and 4, a bottom 15 from the longitudinal edges of which upstand side walls 16 and 17. Similarly, as shown, particularly, in FIG. 4, the bottom 15 has upstanding from its tranvserse end edges, end walls 18 and 19. The upper ends of the said walls are illustrated in cross-section in FIG. 9 to have mounted thereon a lid or cover 20.

As further shown in FIGS. 1 and 2 each of the end walls 18 and 19, at its upper end, is provided with thickened portions, respectively, 21 and 22, which have their lower ends or edges, respectively, as a rounded corner 23 and 24 to act as finger grips or hand holds, in the transportation and carrying of the said chest.

The said chest, including each of the heretofore identified parts, is formed from expansible polystyrene foam particles which in the final form, has a relatively thick cross-section and provides a relatively high degree of insulation against transfer of heat and cold therethrough. The exterior surface of expansible polystyrene foam is relatively soft and can be indented by the application thereto of relatively small forces. The bottom 15 and the portions of the side and end walls adjacent and upwardly of the bottom are subjected to a considerable amount of unintended pressure as by the rough surface on which the bottom is placed and by a person or individual walking too close thereto and inadvertently kicking the same. This soon results in a damaged and unsightly object.

In order to protect the undersurface of the said chest bottom 15 and the immediately adjacent portions of the upstanding walls 16, 17, 18 and 19 there has been secured to the chest a protecting outer member or skin. The thickness of the said outer member is exceedingly thin by comparison with the thickness of the chest bottom and its walls. The said protecting member or skin is illustrated in FIG. 5, indicated in its entirety by the reference numeral 30 and comprises a body portion 25 of an area substantially equal to the exterior area of the bottom 15 and from which body portion 25 there upstands and has integral therewith longitudinal side walls 26 and 27 while upwardly extending from the transverse ends of the said body portion 25 are end walls 28 and 29.

As illustrated in FIGS. 3 and 4 the said bottom guard or protecting skin, indicated in its entirety by the reference numeral 30, are pressed into close engagement with the outer surface of the said bottom 15 and adjacent upstanding portions of the chest side and end walls 16, 17, 18 and 19.

The lid or cover indicated in its entirety by the reference numeral 20, in the main, is formed of expansible polystyrene foam and comprises a body portion 31 from the transverse ends of which depend end walls 32 and 33 while from the longitudinal edges depend side walls 34 and 35.

The said cover or lid body portion 31 together with its walls 32, 33, 34 and 35 are formed of polystyrene foam and which is covered with a protecting sheet or skin indicated in its entirety by the reference numeral 36 and comprises, similar to the bottom protecting skin 30, a body portion of an area equal to the top or cover body portion 31 and depending side walls and end walls of a depth equal to the depth of the cover walls, 32, 33, 34 and 35 and which protecting skin is formed of a polystyrene sheet, all as is subsequently made clear.

For symmetry in design the cover 20 is provided at its opposite ends with outwardly projecting thickened portions 37 and 38 which overlie the thickened portions 21 and 22 at the top portions of the chest end walls and which form the carrying handles, or hand holds, for the chest and its cover, as above pointed out.

As stated above the main portion of the chest and the cover are each formed of expansible polystyrene foam while the protecting skins are each preformed from a polystyrene sheet. Any other forms of plastic may be employed providing they are compatable with one another and can be permanently secured, or bonded, or affixed to one another, as is the polystyrene foam and polystyrene sheet as described hereinafter. One such other material is polyvinyl chloride which when in sheet form can be pre-molded to any disclosed shape and bonded to the polystyrene body.

The chest itself in being formed of expansible polystyrene foam, or some other form of plastic capable of formation under heat, is formed in a demountable mold formed of several parts. As disclosed in FIG. 6, the mold core for forming the chest comprises a base 40 on which is disposed to upstand therefrom the mold inner member or core 41. The core 41 has its external surface to the exact reverse contour of the interior surface of the chest, wherefore, the eventual chest, as will be made clear by a study of the drawings, is provided with the offsets and any other inwardly projecting portions desired. The mold core 41 and the base 40 are preferably formed as a single member as disclosed herein but said parts may be made as separate members, that is, the base 40 is made separate from the core 41 and said parts accurately assembled with one another in any suitable manner as by interengaging shoulders on said parts.

Outwardly spaced from the core 41 is the outer mold, indicated in its entirety by the said reference numeral 43, and which comprises a main or body portion 44 and an upper connecting portion, or chest bottom forming portion, 45.

The mold body forming portion 44 is accurately positioned with respect to the inner mold or core 41 through the formation on the base 40 of a shoulder 46 against which the inner surface of the lower open end of the said mold portion 44 engages.

With the mold base 40 supporting the core 41 in operative position and the said mold base 40 through its shoulder 46 supporting and positioning the mold outer body portion 44–45 there is provided between the opposed inner surface of the said mold body portion 44–45 and inner surface of the mold core 41 a space. This space is of a width corresponding exactly to the thickness of the chest walls 16–19 and to any offset or shoulder portions on the inner wall of the chest. This space is now filled with the proper amount of expansible polystyrene foam particles, or granules. This positioning of the mold parts results in a space between the mold bottom forming part 45 and the closed end of the core 41 again the exact thickness of the bottom of the final chest. It is understood that at the time of placement of the mold part 44–45 on the mold base 40, as by utilizing a portion of the space between the mold core 41 and mold body portion 44, expansible polystyrene foam particles, or granules, is supplied to form the bottom of the chest.

The mold along with its polystyrene foam particles, or granules, is now subjected to the acceptable process for expanding and hardening the polystyrene foam particles or granules, to the eventual formation of the said chest or the like.

Prior to this time the bottom and sides protecting skin 30 had been formed and is at the disposal of the operator making the said polystyrene foam chest.

As is well-known the press on which the mold parts are mounted includes a pair of rams or a ram and a platen. If two rams are employed each the inner mold parts and the outer mold part or parts are moveable relative to one another and relative to the machine and this movement is either automatically controlled or manually operated by the operator. In either event the outer mold and its parts is moveable in order to recover the molded part.

As is further well-known, in the formation of the chest the said polystyrene foam particles, or granules, are subjected to heat and pressure for a given length of time, such as, approximately, three minutes. After the said mold and polystyrene foam particles, or granules, has been subjected to the heat for approximately two minutes, that is, approximately one minute before the final set up and hardening of the chest takes place, and while the said formed and almost cured chest is relatively heat soft, the said mold 44-45 is actuated by its ram to remove the same from the almost cured product, here shown as the chest, and which will leave the parts in the positions relative to one another as illustrated in FIG. 7. At this time the bottom guard skin 30, previously formed, as above noted, is disposed on the now substantially formed but exposed chest bottom in the position thereof illustrated in dot and dash line 47 in FIG. 7. It should be repeated at this time that the said chest bottom 15 and the adjacent portions at the side and end walls 16-19 are still, relatively, heat soft.

With the parts in the positions illustrated in FIG. 7 the mold outer member 44-45 is now returned to its position through the operation of its carrying and operating ram. The parts are now in the position illustrated in FIG. 8 and wherein it will be seen that the walls 26, 27, 28 and 29 of the protecting bottom skin 30 are pressed into the adjacent portions of the lower ends of the chest bottom walls 16, 17, 18 and 19. At the same time the panel or body portion 25 of the protecting skin 30 is pressed against the outer, still, relatively heat soft surface of the chest bottom 15.

Due to the compatability or affinity of the expansible polystyrene foam and the previously formed polystyrene sheet the contacting surfaces of these parts are united with one another by an infusion of the material in the adjacent and contacting surfaces of the parts.

After the said mold portion 44-45 has been returned to its operation the molding process is continued for the balance of the molding cycle time, as noted above, approximately one minute more.

From the foregoing it will now be apparent that there has been provided a chest formed for the most part from relatively soft polystyrene foam to which has been secured a protecting skin for the outer surface of the chest bottom and the lower portions of the chest side and end walls. It will be readily understood that the upstanding ends and side walls of the bottom protecting skin are made to the desired height that they may effectively act as a kick strip in protecting the chest.

The cover or top protecting skin 36, as noted above, is provided with a body portion of an area equal to the upper surface of the cover body portion 31, said protecting body portion being identified in the drawings by the reference numeral 48 and, similar to the protecting skin 30, said body portion 48 has depending from its edges walls, such as end walls 49 and 50 together with side walls 51 and 52. Again, as noted above, the said protecting cover or skin depending walls 49-52 are of the same height as the top or cover depending walls 32-35.

The method of securing the said top or cover skin is very similar to the method of applying the bottom protecting and kick strip skin and which method or process for the said cover is illustrated in FIGS. 10, 11 and 12 of the drawings.

As shown in FIG. 10 there is provided a mold base 53 upstanding from which is the center core 54 which corresponds to the interior of the cover or top. Outwardly of the core 54 the flange or base portion 53 is provided with shoulders 55 for positioning relative thereto the outer mold member 56. By studying FIG. 10 it will be readily understood the positioning of the base 53 and its core 54 with respect to the outer mold member will result in a space between the opposed surfaces. This space is then supplied with the proper amount of polystyrene foam particles, or granules, whereupon the necessary molding heat is supplied to the core and outer mold for effecting the proper reaction of the said polystyrene foam particles or granules.

As was noted above in connection with the formation of the bottom protecting skin and kick strip, approximately one minute before the said top or cover is completely formed the outer mold 56 is removed and then the protecting skin 36, including the top panel 48 and depending sides 49-52, previously completely formed, is placed over the almost finished top or cover, as shown in dotted lines 57a in FIG. 11.

After the positioning of the said protecting skin 36, as illustrated at 57a in FIG. 11, the outer mold 56 is then reapplied and pressed to its final, or operative, position as illustrated in FIG. 12, and molding operation completed, that is, carried on for the above suggested one minute longer.

After the molding operation has been completed the base 53 with its core 54 is removed from the interior of the said cover and the outer mold 56 is removed from the said cover whereupon the completed cover as illustrated in FIG. 9 is obtained for mounting on the chest, all as illustrated in elevation in FIGS. 1 and 2 and in cross-section in FIG. 9.

The modification illustrated in FIG. 13 is the cooler chest of FIG. 1 longitudinally sectioned to disclose an interior liner, indicated in its entirety by the reference numeral 57. The said liner or hard skin is formed from a sheet polystyrene and includes a bottom 58 of an area to completely cover the interior of the bottom 15 of the cooler chest. Upstanding from opposite ends of said liner bottom 58 are end walls 59 and side walls 60 and which side and end walls are each of an area to completely cover the interior surface of a side wall 16 or 17 and an end wall 18 or 19, respectively of the cooler chest.

The said liner 57 is mounted in operative position in substantially the same way that the outer member for the cooler cover or lid and in the same way the bottom and end and side walls are covered with the bottom protecting skin 30. In other words the cooler on the whole is formed from polystyrene foam granules or particles in the same manner as above set forth and fully and completely disclosed in FIG. 6.

At this time instead of raising the exterior mold 43 from the partially formed and cured polystyrene chest, the interior mold or core assemble 40a is withdrawn from the interior of the partially finished cooler chest.

Figure 15:
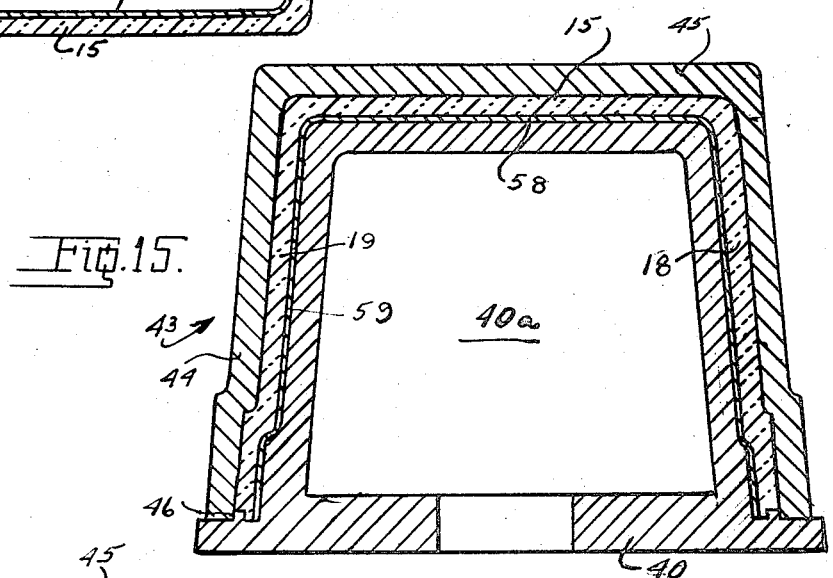
FIG. 15 is a vertical sectional view, similar to FIG. 14 showing the final step in the method of producing the chest of FIG. 13.

As noted above this operation is effected approximately two minutes after the commencement of the curing and hardening step and wherefore the parts will now be in the position illustrated in FIG. 6. At this time the inner skin 57 is mounted in position with respect to the cooler chest as illustrated in phantom lines in FIG. 14 and indicated by the reference numeral 61. Obviously the said liner 57 may be placed on the inner mold 40a when in its withdrawn position and whereupon the said inner mold is returned to its normal operative position as illustrated in FIG. 15.

After this positioning of the parts, as set forth above, the parts are again subjected to heat and pressure for the remaining or final minute of the curing process and which, again as noted above, permanently and securely bonds the cooler chest, per se, to the inner liner 57.

Figure 14:
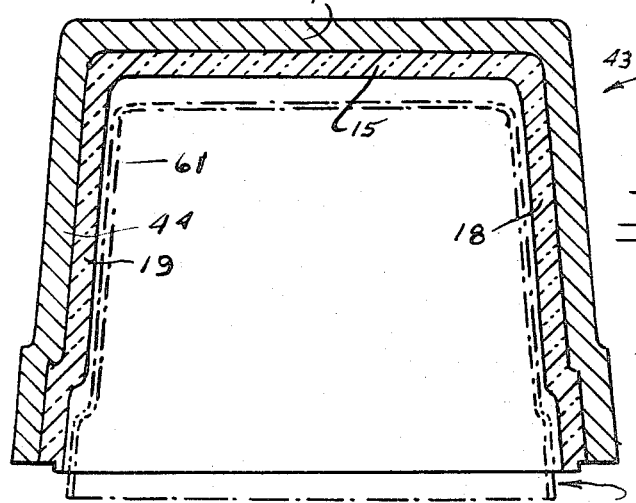
FIG. 14 is a vertical sectional view showing, what may be termed, the second step in the method of production of the chest of FIG. 13.

Obviously the inner and outer mold forming members, 43 and 40a, may each be withdrawn from its operative position after the first two minutes of the curing and hardening of the polystyrene foam granules or particles and whereupon both the outer bottom and kick strip skin 30 as well as the inner skin 57 are placed in operative positions as respectively illustrated in FIGS. 7 and 14 and whereupon the mold parts are returned to their operative positions for the remaining final minute of the curing and hardening process and with the result that the cooler chest will have a hard skin inner surface and a hard outer bottom surface and kick strip.

From the foregoing it will now be appreciated that a relatively complete article may have secured thereto a protecting skin for the entire outer and inner surfaces thereof or the said outer protecting skin may be applied only to a portion of the container. In other words the chest or cooler could have the bottom 15, both inside and outside, and upstanding walls 16, 17, 18 and 19, again, both the inside and outside thereof, for their full height upwardly of the bottom 15 covered with a protecting skin, instead of merely having its bottom so protected and a kick strip for the lower portions of the end and side walls.

What is claimed is:

1. A container or chest of rectangular plan including a bottom and upstanding walls from the periphery of said bottom formed of plastic granules to provide the said container or chest with said bottom and walls relatively thick for insulating the interior against transfer of heat to or from the said interior, said chest bottom and upstanding walls outer surface being relatively soft and subject to dents and bruises on contact with exterior forces, a relatively hard plastic strip along the lower edge of each of said walls extending upwardly from the bottom to a point below the upper ends of said walls to provide said walls with a hard exterior surface for said portion of said walls upwardly of its bottom to said point below the upper ends of said walls and protecting the said walls against damage, said chest having an opening thereinto as defined by the upper edges of the upstanding walls, said upper ends of said walls having a portion of reduced thickness extending downwardly from their upper ends with a shoulder at the lower end of said reduced thickness portion, a cover including a panel of an area equal to the area of the container or chest open upper end and depending peripheral walls from said cover panel, said cover panel and depending walls having a thickness equal to the thickness of the container or chest walls and each cover wall having a reduced thickness portion or flange downwardly projecting from the lower edge of each of its walls to nest with the reduced thickness upper ends of the chest walls and rest on the container chest walls shoulder, said cover and its depending peripheral walls being formed of plastic granules to provide said cover panel and depending walls with relative thickness for insulating the interior of the chest against transfer of heat through the said cover, said cover panel and depending walls outer surface being relatively soft and subject to dents and bruises on contact with exterior forces, and a relatively hard plastic covering on the exterior of said cover panel and depending walls for protecting said cover panel and depending walls exterior surfaces against damage.

2. A container or chest of rectangular plan including a bottom and upstanding walls from the periphery of said bottom formed of plastic granules to provide the said container or chest with said bottom and walls relatively thick for insulating the interior against transfer of heat to or from the said interior, said chest bottom and upstanding walls outer surface being relatively soft and subject to dents and bruises on contact with exterior forces, a relatively hard plastic strip along the lower edge of each of said walls extending upwardly from the bottom to a point below the upper ends of said walls to provide said walls with a hard exterior surface for said portion of said walls upwardly of its bottom to said point below the upper ends of said walls and protecting the said walls against damage, said chest having an opening thereinto as defined by the upper edges of the upstanding walls, said upper ends of said walls having a portion of reduced thickness extending downwardly from their upper ends with a shoulder at the lower end of said reduced thickness portion, a cover including a panel of an area equal to the area of the container or chest open upper end and depending peripheral walls from said cover panel, said cover panel and depending walls having a thickness equal to the thickness of the container or chest walls and each cover wall having a reduced thickness portion or flange downwardly projecting from the lower edge of each of its walls to nest with the reduced thickness upper ends of the chest walls and rest on the container chest walls shoulder, and said cover panel and its depending walls outer surfaces being formed of hard plastic with its depending walls outer surface in the same plane as the plane of the container or chest walls.

References Cited

UNITED STATES PATENTS

| | | | |
|---|---|---|---|
| 3,120,319 | 2/1964 | Buddrus | 215—13 |
| 1,901,556 | 3/1933 | Gottschalk | 220—9 |
| 2,552,641 | 5/1951 | Morrison | 220—9 |
| 2,642,920 | 6/1953 | Simon et al. | 156—78 |
| 2,725,271 | 11/1955 | Cummingham | 312—214 |
| 3,037,652 | 6/1962 | Wallace | 220—9 |
| 3,091,946 | 6/1963 | Kesling | 220—9 |
| 3,094,448 | 6/1963 | Cornelius | 220—9 |
| 3,120,570 | 2/1964 | Kennedy et al. | 264—45 |
| 3,121,522 | 2/1964 | Ragnow | 220—9 |
| 3,150,792 | 9/1964 | Bright | 220—9 |
| 3,152,199 | 10/1964 | Roberts | 264—45 |

THERON E. CONDON, *Primary Examiner.*

JAMES R. GARRETT, *Assistant Examiner.*